July 2, 1957  C. H. WILLIAMS  2,797,887
COLLAPSIBLE MORTARBOARD STAND
Filed July 11, 1956  3 Sheets-Sheet 1

Clifford H. Williams
INVENTOR.

BY

July 2, 1957  C. H. WILLIAMS  2,797,887
COLLAPSIBLE MORTARBOARD STAND
Filed July 11, 1956  3 Sheets-Sheet 2
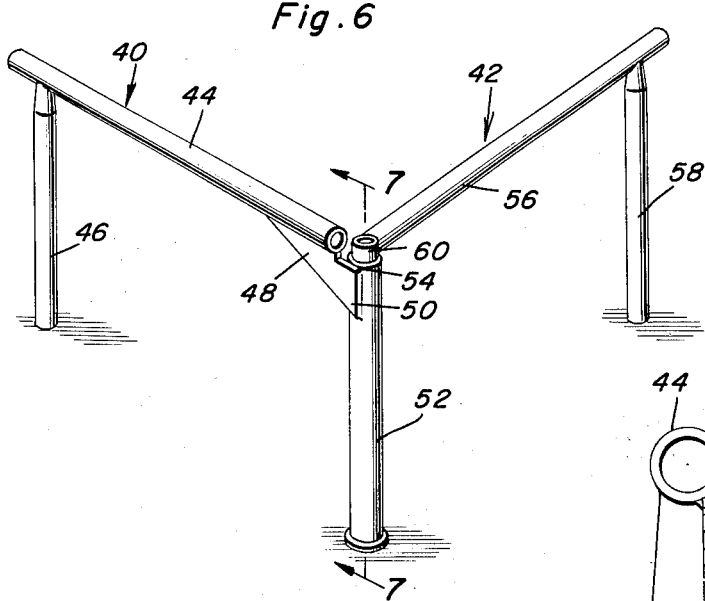
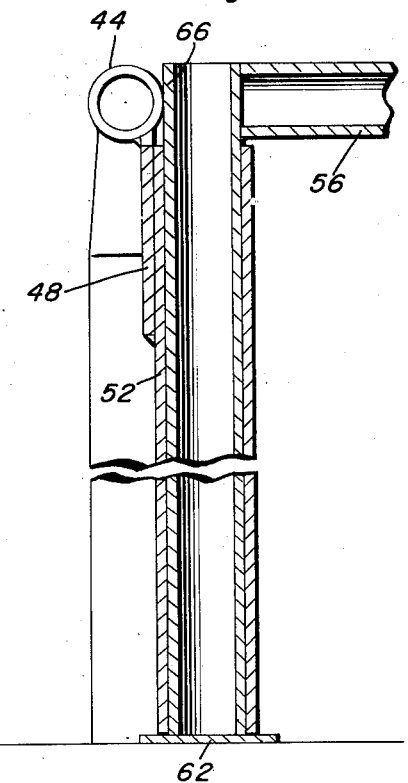
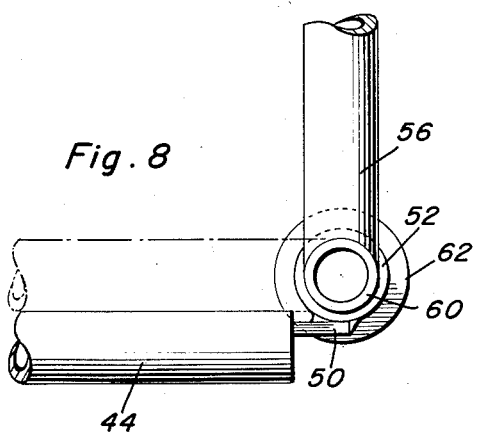
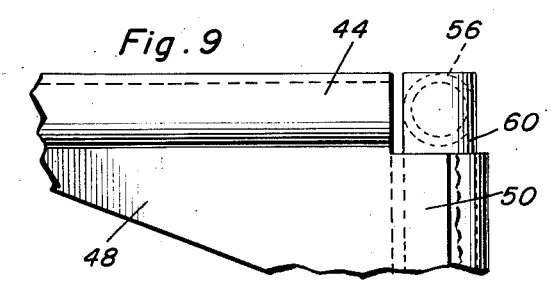
Clifford H. Williams
INVENTOR.

July 2, 1957
C. H. WILLIAMS
2,797,887
COLLAPSIBLE MORTARBOARD STAND
Filed July 11, 1956
3 Sheets-Sheet 3
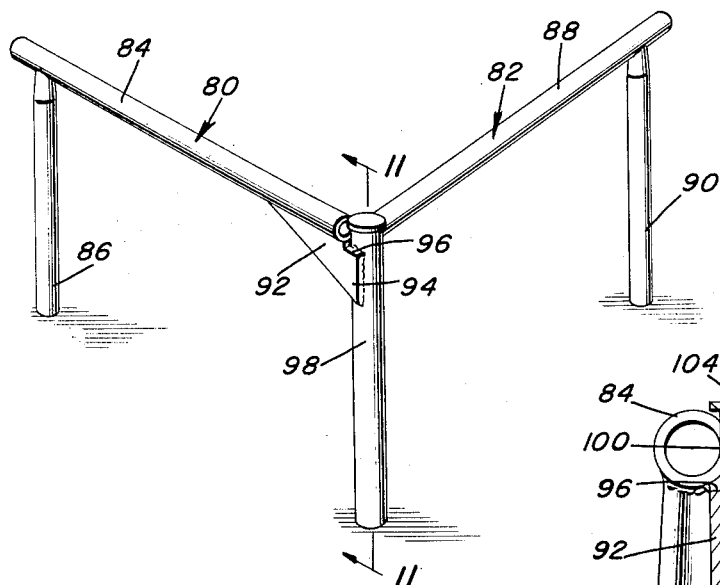
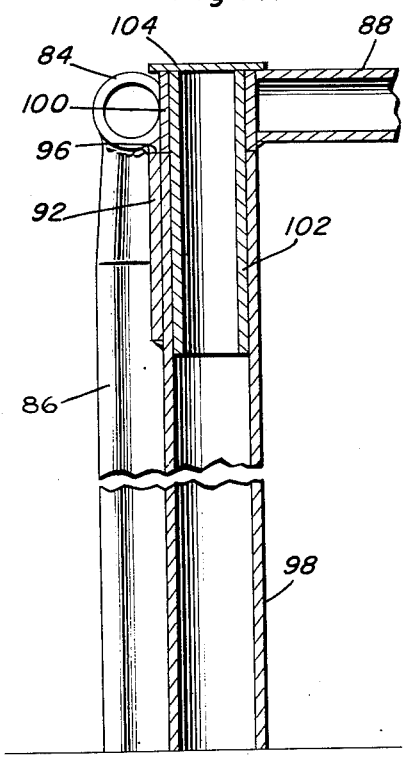
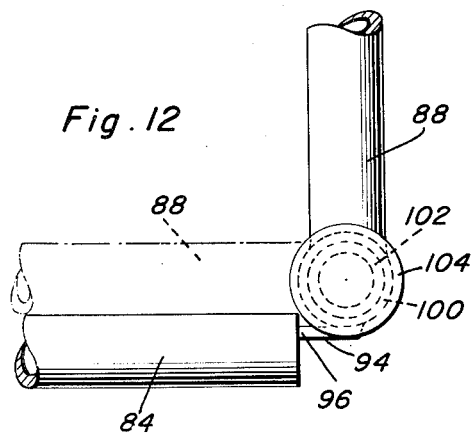
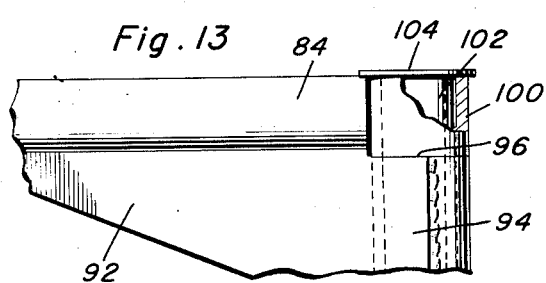
Clifford H. Williams
INVENTOR.

United States Patent Office

2,797,887
Patented July 2, 1957

2,797,887

COLLAPSIBLE MORTARBOARD STAND

Clifford H. Williams, Tucson, Ariz., assignor to Marion H. Adkins, Tucson, Ariz.

Application July 11, 1956, Serial No. 597,122

10 Claims. (Cl. 248—167)

This invention comprises a novel and useful collapsible mortarboard stand, more particularly relating to a device which can be readily transported in collapsed form to a construction site and then extended or erected for supporting a mortarboard of a plasterer, mason or other artisan.

This application constitutes a continuation-in-part of my prior co-pending application Serial No. 404,108, filed January 14, 1954 for Collapsible Mortarboard Stand and now abandoned.

An object of this invention is to provide a stand for a mortarboard which is readily collapsible for storage or shipment.

Another object of this invention is to provide a collapsible stand which may be utilized as a saw horse or as a light duty scaffold.

A further object of this invention is to provide a collapsible mortarboard stand which is simple and efficient in construction, and durable and lasting in use.

Yet another object of this invention is to provide a collapsible mortarboard stand comprising inverted L-shaped and U-shaped sections which are pivotally connected for horizontal swinging movement about a vertical axis through a leg of a U-shaped section.

A still further important object of the invention is to provide a device in accordance with the preceding objects wherein legs of the L-shaped and U-shaped sections may be concentrically journaled upon each other.

A still further important purpose of the invention is to provide a device in conformity with the above-mentioned objects wherein the pivotal connection between the L-shaped and U-shaped sections will provide an efficient journal bearing between those sections and will prevent disengagement of the sections at the pivot bearing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 6 is a perspective view of a second embodiment of the mortarboard stand with its legs in its extended position;

Figure 7 is a vertical transverse sectional view taken upon an enlarged scale substantially upon the plane indicated by the section line 7—7 of Figure 6, parts being broken away;

Figure 8 is a fragmentary top plan view upon an enlarged scale of the pivot connection of the legs of the embodiment of Figure 6 an alternative position of one of the legs being shown in folded position in dotted lines therein;

Figure 9 is an elevational detail view of the pivot connection of the legs as shown in Figure 8;

Figure 10 is a perspective view of a third form of the mortarboard stand showing the legs in their extended position;

Figure 11 is a detail view taken upon an enlarged scale substantially upon the plane indicated by the section line 11—11 of Figure 10, parts being broken away;

Figure 12 is a fragmentary top plan view of the arrangement of Figure 10, the folded position of the legs being indicated in dotted lines; and Figure 13 is an elevational view of the leg assembly and the pivot hinge of the same, part being broken away and shown in vertical section.

In each of the three embodiments of the mortarboard stand illustrated in the accompanying drawings and described in detail hereinafter, there are provided a pair of leg assemblies hingedly connected for horizontal swinging movement about a vertical axis. The leg assemblies in each embodiment are composed of a U-shaped section, comprising a pair of supporting legs having a rigidly connected horizontal member secured thereto and an L-shaped section comprising a supporting leg and a horizontally extending member. A fastening means connects the L-shaped section to the U-shaped section, being disposed concentrically of a leg of the latter for horizontal swinging movement about a vertical axis. The distinction between the three embodiments or species disclosed herein resides in the construction of this fastening means.

Figure 1:
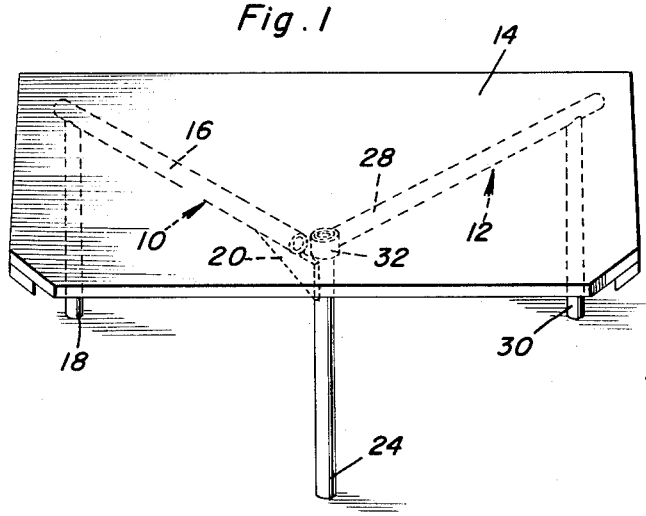
Figure 1 is a perspective view showing the form of mortarboard disclosed in my above identified co-pending application, and is a perspective view thereof, certain concealed parts being shown in dotted lines therein, and showing the mortarboard in its extended position.
Figure 3:
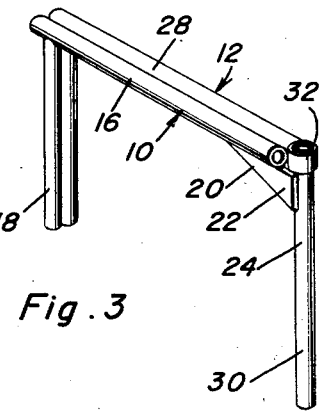
Figure 3 is a perspective view of a mortarboard stand showing the legs in collapsed position.
Figure 2:
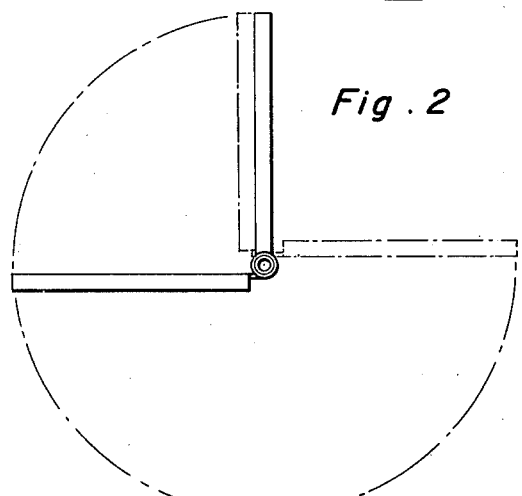
Figure 2 is a top plan view of the mortarboard stand of Figure 1, showing the various positions of the legs in dotted lines therein.
Figure 5:
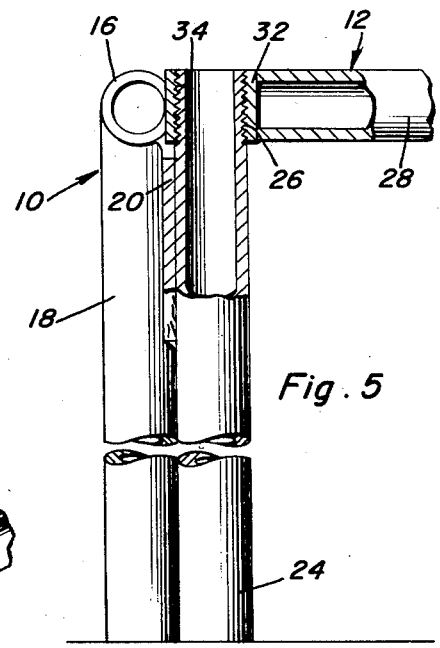
Figure 5 is an elevational view, taken partly in section, and partially broken away, of the embodiment of Figure 1.
Figure 4:
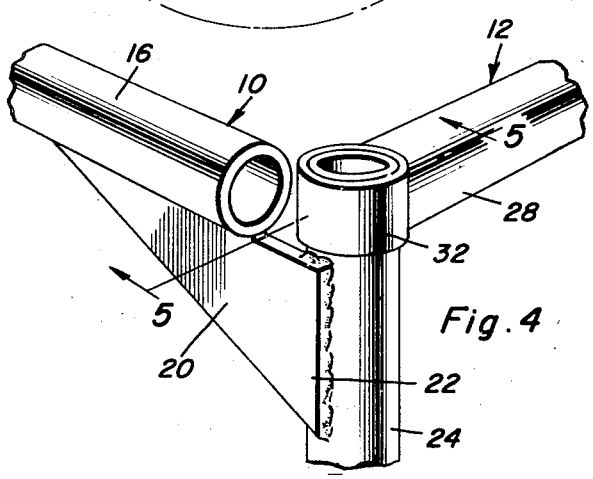
Figure 4 is a detailed view in perspective showing upon an enlarged scale the pivot hinge connecting the inverted L-shaped and U-shaped sections of the mortarboard stand.

Referring now more specifically to Figures 1–5 of the accompanying drawings, it will be seen that the improved mortarboard stand forming the subject of this invention includes a substantially inverted U-shaped first section 10 having a substantially L-shaped second section 12 pivotally secured thereto. When the sections 10 and 12 are placed in the position as shown in Figure 1, a mortarboard 14 may be placed thereon and supported thereby.

Section 10 is formed of a horizontal tubular bar 16 having a tubular leg 18 rigidly secured thereto adjacent one end thereof. Rigidly secured to the other end of the bar 16 and extending in the same direction as leg 18 is an ear 20. The ear 20 is provided with a portion 22 extending beyond the end of bar 16 in a direction away from the leg 18. A tubular leg 24 is rigidly secured to the other end of projection 22 by any suitable means, such as welding. The leg 24 has a major portion thereof extending parallel to and in the same direction as the leg 18. The leg 24 is also provided with an externally threaded portion 26 extending in the opposite direction from the projection 22. The threaded portion 26 is spaced from the end of bar 16 having the ear 20 secured thereto.

The L-shaped section 12 is formed of a tubular horizontal bar 28 having a tubular leg 30 rigidly secured to one end thereof. The other end of the bar 28 is provided with a collar 32 having an internally threaded bore 34 extending therethrough the axis of which is parallel to the axis of the leg 30. The section 12 is secured to the section 10 by the insertion of the threaded portion 26 of leg 24 in the threaded bore 34 of the collar 32. The leg 30 extends in the same direction as and is parallel to the legs 24 and 18. The free ends of the legs 18, 24 and 30 all terminate in the same plane which is perpendicular to the axes of the legs.

In practical use of the device, the sections 10 and 12 are assembled as above described. The device is then transported to the construction site in the folded position shown in Figure 3. Then, the bars 16 and 28 which are coplanar, are spread to a position, as shown in Figure 1, and the device placed with the free ends of legs 18, 24 and 30 resting on a supporting surface. A mortarboard 14 is then placed on the bars 16 and 28 and the device is ready for use by the artisan. The device forms a substantially rigid three-point suspension for the mortarboard 14.

Referring next to the embodiment of Figures 6–9, it will be observed that the mortarboard stand as in the preceding embodiment consists of two sections indicated generally by the numerals 40 and 42. The section U-shaped 40 has a horizontal tubular rod 44 adjacent one end of which is secured a vertical tubular rod 46 constituting a leg therefor. At its other end, the rod 44 has welded or otherwise fixedly secured thereto a longitudinally extending ear 48 having a portion 50 which projects beyond the end of the rod 44. This end is welded to a vertical tubular member 52. It will be observed that the upper edge of the projecting portion 50 of the ear 48 is horizontally recessed as at 54, this recessed surface being in the same horizontal plane as the upper end portion of the leg 52. This construction will be readily apparent from Figure 7.

The other L-shaped section 42 likewise has a horizontally extending tubular rod 56 whose upper surface lies in the same horizontal plane as that of the rod 44 of the section 40. Adjacent one end the rod 56 is provided with a vertical depending leg 58 rigidly secured thereto, while at its other end is welded or otherwise fixedly secured to the upper end of a pivotal connecting means consisting of a tubular vertical leg member 60 or sleeve. The upper end of the member 60 terminates in the same horizontal plane as that of the upper surfaces of the rods 44 and 46.

As will be best apparent from Figure 7, the tubular leg 60 extends entirely through the leg 52, and is closed at its lower end as by a plate 62 which underlies the lower end of the plate 52. The plate 62 constitutes a base member by which the leg will rest upon its supporting surface, and will also serve to prevent separation of the leg 60 from the leg 52.

The operation of this form of the invention is the same as that of the preceding embodiment, except that the two sections each consist of an inverted U-shaped member with the leg of each of the two members being disposed in concentric horizontally swinging position or engagement. The section 42 may likewise be considered to be an L-shaped section composed of members 56 and 58 with the concentric elements 52, 60 comprising a pivotal connection between the sections 40 and 42.

Attention is next directed to the still further modified construction of Figures 10–13. In this form there are likewise provided inverted U-shaped and L-shaped sections 80 and 82 which are generally similar to the sections 40 and 42 of the preceding embodiment. The U-shaped section 80 has the horizontal tubular rod 84 with a vertical leg 86 secured to one end thereof, while the L-shaped section 82 has the horizontal tubular rod 88 with a fixedly attached vertical supporting leg 90. A longitudinally projecting plate 92 is welded or otherwise fixedly secured to the end of the tubular rod 84, having an end portion 94 projecting beyond the end of the same, a horizontal recess 96 being provided in this end portion.

As in the preceding embodiment, the projecting end portion 94 is welded or otherwise fixedly secured to the upper portion of a vertical leg 98.

The horizontal rod 88 of the L-shaped section 82 has its end welded or otherwise fixedly secured to a sleeve or collar 100 which embraces and is journaled upon the upper portion of a hollow rod or sleeve 102 which is provided with a top closure plate or enlarged head 104, and which sleeve is received within the upper end of the leg 98.

In some instances it may be desired to fixedly secure the tubular rod 88 to the sleeve 102 as by welding the same thereto, with the sleeve 102 being rotatably received in the upper end of the leg 98. In other instances, it may be preferred to rigidly secure the sleeve 102 in the member 98 with the collar 100 being rotatable thereon.

In either event, there is provided a pivotal connection concentric with the axis of the leg 98 of the U-shaped section and the collar will rest upon the upper surface of the leg 98 which lies in the same plane as the horizontal recess surface 96 of the ear 92, and the upper surfaces of the hollow rods 84 and 88 will also lie in the same horizontal plane.

In operation this form of the invention is identical to that previously described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A collapsible mortarboard stand comprising a pair of hinged leg assemblies, said leg assemblies comprising U-shaped and L-shaped sections, connecting means pivotally connecting said sections for horizontal swinging movement about a vertical axis through a leg of the U-shaped section, said U-shaped section comprising a pair of spaced, substantially vertical tubular legs, one leg comprising a portion of said connecting means, a tubular substantially horizontal bar having one end mounted upon the other of said pair of legs, an ear portion mounted beneath the other end of said bar and projecting therebeyond and fixed substantially tangentially on said one leg below the upper portion thereof, said L-shaped section including a tubular substantially horizontal bar, said connecting means including a pivot member fixed on one end of said last mentioned tubular horizontal bar and having a pivotal engagement with said one leg of said U-shaped section, said pivot member and said one leg being concentrically mounted for relative turning movement about said vertical axis, said L-shaped section including a substantially vertical leg mounted on the other end of said last mentioned tubular substantially horizontal bar, said bars being coplanar above the legs to provide an unobstructed top surface for supporting thereon a mortarboard.

2. The combination of claim 1 wherein said pivot means and said one leg comprising concentric tubular members and with the ear portion being secured to the outermost of the concentric tubular members.

3. The combination of claim 1 wherein said pivot member is disposed in said one leg and has an enlarged head resting upon the upper end of the latter.

4. The combination of claim 1 wherein said pivot member is secured at its opposite ends to said one leg against endwise movement and extends thereabove.

5. The combination of claim 1 wherein said pivot member is secured at its opposite ends to said one leg against endwise movement and extends thereabove, the horizontal bar of said L-shaped section being mounted upon the upwardly extending end of said pivot member.

6. The combination of claim 1 wherein said pivot member is shorter than said one leg and has its lower end terminating within the latter.

7. The combination of claim 1 wherein said pivot member is longer than said one leg and has both of its ends projecting outwardly beyond those of the latter.

8. The combination of claim 1 wherein said ear portion has a vertically recessed horizontal surface on its upper portion, said horizontal surface being coplanar with the top of the outermost tubular member.

9. A collapsible mortar board stand comprising: substantially inverted U-shaped and L-shaped sections, means pivotally connecting one end of each section for relative swinging movement in a horizontal plane, said U-shaped section including a pair of spaced tubular legs, one of said legs having a threaded upper end portion, a tubular horizontal bar having one end portion mounted on the other leg, and an ear mounted beneath the other end portion of said bar and projecting therebeyond and fixed substantially tangentially on said one leg below the threaded end portion thereof, said L-shaped section including a tubular horizontal bar, a collar fixed on one end of the second-named bar in the horizontal plane thereof and threadedly mounted on the upper end portion of the first-named leg, and a tubular leg mounted on the other end portion of said second-named bar, said bars being coplanar and above the legs for receiving and supporting a mortar board.

10. A collapsible mortar board stand comprising a pair of leg assemblies consisting of substantially inverted U-shaped and L-shaped sections, means pivotally connecting one end of each section for relative horizontal swinging movement about a vertical axis through a leg of the U-shaped section, said U-shaped section including a pair of spaced, substantially vertical tubular legs, one leg having an upper portion for pivotally connecting said U-shaped and L-shaped sections, a tubular substantially horizontal bar having one end mounted upon the other leg, an ear portion mounted beneath the other end portion of said bar and projecting therebeyond and fixed substantially tangentially on said one leg below the said upper portion thereof, said L-shaped section including a tubular substantially horizontal bar, said connecting means including a pivot member fixed on one end of said second named bar and having pivotal engagement with said upper portion of said first named leg, said pivot member and said upper portion being concentrically mounted for relative turning movement about said vertical axis, said L-shaped section including a substantially vertical tubular leg mounted on the other end portion of said second named bar, said bars being coplanar above the legs to provide an unobstructed coplanar top surface for receiving and supporting thereon a mortarboard.

References Cited in the file of this patent

UNITED STATES PATENTS

| 114,519 | Black | May 9, 1871 |
| 293,847 | Bremer | Feb. 19, 1884 |
| 358,836 | Casler | Mar. 8, 1887 |
| 649,900 | Brennan | May 22, 1900 |
| 1,310,638 | Summers | July 22, 1919 |
| 2,666,646 | Jennings | Jan. 19, 1954 |

FOREIGN PATENTS

| 66,637 | Germany | Jan. 21, 1892 |